United States Patent
Wang et al.

(10) Patent No.: US 12,499,218 B2
(45) Date of Patent: Dec. 16, 2025

(54) MALWARE PROTECTION BASED ON FINAL INFECTION SIZE

(71) Applicant: BRITISH TELECOMMUNICATIONS PUBLIC LIMITED COMPANY, London (GB)

(72) Inventors: Xiao-Si Wang, London (GB); Jessica Welding, London (GB)

(73) Assignee: British Telecommunications Public Limited Company, London (GB)

( * ) Notice: Subject to any disclaimer, the term of this patent is extended or adjusted under 35 U.S.C. 154(b) by 267 days.

(21) Appl. No.: 17/995,365

(22) PCT Filed: Mar. 30, 2021

(86) PCT No.: PCT/EP2021/058360
§ 371 (c)(1),
(2) Date: Oct. 3, 2022

(87) PCT Pub. No.: WO2021/198295
PCT Pub. Date: Oct. 7, 2021

(65) Prior Publication Data
US 2023/0161874 A1    May 25, 2023

(30) Foreign Application Priority Data
Apr. 3, 2020 (EP) ................................. 20168112

(51) Int. Cl.
*G06F 21/55* (2013.01)
(52) U.S. Cl.
CPC ...... *G06F 21/552* (2013.01); *G06F 2221/034* (2013.01)
(58) Field of Classification Search
CPC .. G06F 21/552; G06F 2221/034; G06F 21/55; G06F 2221/03
See application file for complete search history.

(56) References Cited

U.S. PATENT DOCUMENTS

| 8,667,581 B2 | 3/2014 | Steeves et al. |
| 8,683,585 B1* | 3/2014 | Chen .................. G06F 21/56 726/22 |

(Continued)

FOREIGN PATENT DOCUMENTS

| CN | 109190375 A | 1/2019 |
| EP | 1990973 A2 | 11/2008 |

(Continued)

OTHER PUBLICATIONS

Combined Search and Examination Report received for Great Britain Patent Application No. 2020915.1, mailed on May 11, 2021, 5 pages.

(Continued)

*Primary Examiner* — Tod R Swann
*Assistant Examiner* — Daniel Elahian
(74) *Attorney, Agent, or Firm* — EIP US LLP

(57) ABSTRACT

A computer implemented malware protection method to protect at least a subset of computer systems in a population of network-connected computer systems, including determining a distribution of predicted final infection size, each predicted final infection size being determined by a forecasting simulation of malware propagation from an originating system in the population; determining a plurality of ranges of final infection size from the distribution; determining weighted associations between clusters of computer systems and ranges of final infection size based on measures of numbers of originating computer systems in each cluster associated with each range of final infection size; and deploying protective measures for one or more clusters of computer systems responsive to the weighted associations.

10 Claims, 6 Drawing Sheets

(56) References Cited

U.S. PATENT DOCUMENTS

| | | | |
|---|---|---|---|
| 9,060,018 | B1 | 6/2015 | Yu et al. |
| 10,084,806 | B2* | 9/2018 | Ward .................. H04L 63/1433 |
| 10,298,598 | B1 | 5/2019 | McClintock et al. |
| 10,742,475 | B2 | 8/2020 | Lai et al. |
| 10,963,802 | B1 | 3/2021 | Gardner et al. |
| 11,283,828 | B2* | 3/2022 | Riccetti .................. H04L 63/20 |
| 11,397,258 | B2 | 7/2022 | Zeng et al. |
| 11,470,103 | B2 | 10/2022 | Dean et al. |
| 11,500,058 | B2 | 11/2022 | Hu et al. |
| 11,727,109 | B2 | 8/2023 | Speakman et al. |
| 11,829,484 | B2 | 11/2023 | Lipkis et al. |
| 11,863,584 | B2* | 1/2024 | Togari .................. G06F 21/566 |
| 12,046,040 | B2 | 7/2024 | Wang et al. |
| 12,126,636 | B2 | 10/2024 | Dean et al. |
| 12,273,376 | B2 | 4/2025 | Wang et al. |
| 2002/0162015 | A1* | 10/2002 | Tang .................. G06F 21/565 726/24 |
| 2011/0078177 | A1* | 3/2011 | Fakeih .................. G06F 16/2474 707/769 |
| 2012/0151588 | A1* | 6/2012 | Wang .................. H04W 12/12 726/24 |
| 2013/0007741 | A1* | 1/2013 | Britsch .................. G06F 9/45558 718/1 |
| 2013/0340080 | A1 | 12/2013 | Gostev et al. |
| 2019/0052659 | A1 | 2/2019 | Weingarten et al. |
| 2021/0160281 | A1 | 5/2021 | Hallaji et al. |
| 2022/0116411 | A1 | 4/2022 | Melicher et al. |
| 2023/0123046 | A1 | 4/2023 | Wang et al. |
| 2023/0161874 | A1 | 5/2023 | Wang et al. |
| 2023/0376598 | A1 | 11/2023 | Wang et al. |
| 2023/0379360 | A1 | 11/2023 | Hallaji et al. |
| 2024/0310851 | A1 | 9/2024 | Ebrahimi Afrouzi et al. |

FOREIGN PATENT DOCUMENTS

| | | |
|---|---|---|
| GB | 2574093 A | 11/2019 |
| WO | 2006132987 A1 | 12/2006 |
| WO | WO-2019185404 A1 | 10/2019 |
| WO | WO-2019185405 A1 | 10/2019 |
| WO | 2020065737 A1 | 4/2020 |
| WO | 2021001237 A1 | 1/2021 |
| WO | WO-2021165256 A1 | 8/2021 |
| WO | WO-2021165257 A1 | 8/2021 |
| WO | WO-2021198295 A1 | 10/2021 |
| WO | 2023169772 A1 | 9/2023 |
| WO | 2023169773 A1 | 9/2023 |
| WO | 2023169774 A1 | 9/2023 |
| WO | 2023169775 A1 | 9/2023 |

OTHER PUBLICATIONS

Combined Search and Examination Report received for Great Britain Patent Application No. 2203355.9, mailed on Oct. 10, 2022, 12 pages.
Combined Search and Examination Report received for Great Britain Patent Application No. 2203361.7, mailed on Oct. 17, 2022, 12 pages.
Combined Search and Examination Report received for Great Britain Patent Application No. 2203366.6, mailed on Oct. 21, 2022, 12 pages.
Combined Search and Examination Report received for Great Britain Patent Application No. 2203371.6, mailed on Nov. 3, 2022, 12 pages.
International Preliminary Report on Patentability received for PCT Patent Application No. PCT/EP2021/083783, mailed on Jul. 13, 2023, 8 pages.
International Search Report and Written Opinion received for PCT Patent Application No. PCT/EP2021/083783, mailed on Mar. 1, 2022, 12 pages.
International Search Report and Written Opinion received for PCT Patent Application No. PCT/EP2023/053486, mailed on Apr. 13, 2023, 13 pages.
International Search Report and Written Opinion received for PCT Patent Application No. PCT/EP2023/053489, mailed on Apr. 13, 2023, 13 pages.
International Search Report and Written Opinion received for PCT Patent Application No. PCT/EP2023/053493, mailed on Apr. 21, 2023, 13 pages.
International Search Report and Written Opinion received for PCT Patent Application No. PCT/EP2023/053494, mailed on Apr. 21, 2023, 13 pages.
Atwood , et al., "Fair Treatment Allocations in Social Networks", arXiv:1911.05489v1, Nov. 1, 2019, 11 pages.
Beyah , et al., "The Case for Collaborative Distributed Wireless Intrusion Detection Systems", Granular Computing, IEEE International Conference on Atlanta, 2006, pp. 782-787.
Eder-Neuhauser , et al., "Malware Propagation in Smart Grid Networks: Metrics, Simulation and Comparison of Three Malware Types", Journal of Computer Virology and Hacking Techniques, vol. 15, 2019, pp. 109-125.
Faghani , et al., "A Study of Trojan Propagation in Online Social Networks", 5th International Conference on New Technologies, Mobility and Security, 2012, 5 pages.
Guillen , et al., "A Mathematical Model for Malware Spread on WSNs with Population Dynamics", Physica A, vol. 545, 2020, 11 pages.
Hosseini, Soodeh , "Defense Against Malware Propagation in Complex Heterogeneous Networks", Cluster Computing, vol. 24, No. 2, 2021, pp. 1199-1215.
Khan , et al., "Cognitive Modeling of Polymorphic Malware using Fractal Based Semantic Characterization", IEEE International Symposium on Technologies for Homeland Security (HST), 2017, 7 pages.
Liu , et al., "An Approach to Finding the Cost-effective Immunization Targets for Information Assurance", Decision Support Systems, vol. 67, Nov. 2014, pp. 40-52.
Matsubara, et al., "Nonlinear Dynamics of Information Diffusion in Social Networks", ACM Transactions on the Web, vol. 11, No. 2, Article 11, Apr. 2017, pp. 1-40.
Muchnik , et al., "Initial Growth Rates of Epidemics Fail to Predict their Reach: A Lesson from Large Scale Malware Spread Analysis", Aug. 2, 2020, 15 pages.
Wright, Rob , "What is Polymorphic Virus?—Definition from WhatIs.com", Available Online at <https://web.archive.org/web/20211127061825/https://www.techtarget.com/searchsecurity/definition/polymorphic-malware>, 2021, 5 pages.
Xu , et al., "Analysis of Malware-Induced Cyber Attacks in Cyber-Physical Power Systems", IEEE Transactions on Circuits and Systems II, 2020, 5 pages.
Combined Search and Examination Report under Sections 17 and 18(3) for Great Britain Application No. 2002121.8, mailed Aug. 4, 2020, 6 pages.
Combined Search and Examination Report under Sections 17 and 18(3) for Great Britain Application No. 2004994.6, mailed Jul. 13, 2020, 5 pages.
Examination Report under 18(3) for Great Britain Application No. 2002122.6, mailed Nov. 30, 2021, 3 pages.
Extended European Search Report for Application No. 20157627.9, mailed on Jun. 12, 2020, 9 pages.
Extended European Search Report for Application No. 20168112.9, mailed on Sep. 4, 2020, 9 pages.
International Preliminary Report on Patentability for Application No. PCT/EP2021/053764, mailed on Sep. 1, 2022, 9 pages.
International Preliminary Report on Patentability for Application No. PCT/EP2021/058360, mailed on Aug. 11, 2022, 14 pages.
International Search Report and Written Opinion for Application No. PCT/EP2021/053763 mailed on Mar. 9, 2021, 13 pages.
International Search Report and Written Opinion for Application No. PCT/EP2021/053764 mailed on Mar. 9, 2021, 13 pages.
International Search Report and Written Opinion for Application No. PCT/EP2021/058360 mailed on Jun. 2, 2021, 12 pages.
Jia Z., et al., "Research on Computer Virus Source Modeling with Immune Characteristics," 2017 29th Chinese Control And Decision Conference (CCDC), May 28, 2017, pp. 4616-4619.

(56) References Cited

OTHER PUBLICATIONS

Liu W., "Web Malware Spread Modelling And Optimal Control Strategies," Scientific Reports, Feb. 10, 2017, vol. 7(42308), 19 pages.
Mieghem P.V., "The Viral Conductance of a Network", Computer Communications, vol. 35, Apr. 18, 2012, pp. 1494-1506.
Search Report under Section 17(5) for Great Britain Application No. 2002122.6, mailed on Aug. 4, 2020, 4 pages.
Wang C., et al., "On Computer Viral Infection and the Effect of Immunization," Proceedings 16th Annual Computer Security Applications Conference (ACSAC'00), Dec. 11-15, 2000, pp. 246-256.
Written Opinion of the International Preliminary Examining Authority for Application No. PCT/EP2021/058360, mailed on Apr. 22, 2022, 7 pages.
Office Action received for European Patent Application No. 21824337.6, mailed on Jul. 1, 2024, 5 pages.

* cited by examiner

MALWARE PROTECTION BASED ON FINAL INFECTION SIZE

PRIORITY CLAIM

The present application is a National Phase entry of PCT Application No. PCT/EP2021/058360, filed Mar. 30, 2021, which claims priority from EP Patent Application No. 20168112.9, filed Apr. 3, 2020 each of which is hereby fully incorporated herein by reference.

TECHNICAL FIELD

The present disclosure relates to the automatic forecasting of malware propagation across a set of computer systems.

BACKGROUND

Conventional malware protection mechanisms are reactive to the detection of malware in a network or the widespread distribution of anti-malware measures. Such approaches are known as "diagnosis and treatment". Similar techniques are used to combat the spread of biological infections. Mitigation measures such as anti-malware or malware-specific protective measures may not be known for some time after an infection has been studied for its effects.

SUMMARY

Accordingly, it is beneficial to provide improvements to the deployment of protections for malware for sets of computer systems.

According to a first aspect of the present disclosure, there is provided a computer implemented malware protection method to protect at least a subset of computer systems in a population of network-connected computer systems, the method comprising: identifying a plurality of clusters of computer systems in the population wherein computer systems within each cluster share at least one common characteristic; determining a distribution of predicted final infection size for the population as a total number of systems infected by a propagation of a malware in the population, the distribution including predictions for infections originating with systems in the population, each predicted final infection size being determined by a forecasting simulation of malware propagation from an originating system in the population, the simulation being performed based on at least one malware propagation model defining at least a transmission rate of malware between systems in the population determined to be in communication with each other, and a removal rate of systems being removed from a state of infection by the malware; determining a plurality of ranges of final infection size from the distribution; determining weighted associations between clusters of computer systems and ranges of final infection size based on measures of numbers of originating computer systems in each cluster associated with each range of final infection size; deploying protective measures for one or more clusters of computer systems responsive to the weighted associations.

In some embodiments, the at least one common characteristic includes: a logical or physical position of computer systems in the population; a network attribute of computer systems in the population; a predetermined role or function of computer systems in the population; and a common type of device of computer systems in the population.

In some embodiments, the at least one malware propagation model identifies interacting pairs of the computer systems in the population based on interactions corresponding to previous communication occurring between the computer systems in the pair.

In some embodiments, the forecasting simulation includes simulating, over a plurality of simulated time periods, a propagation of the malware from an originating system in the population, the simulation being based on a number of interactions per time period between each interacting pair of computer systems in the population, the transmission rate and the removal rate.

In some embodiments, the distribution includes predictions for infections originating with each system in the population.

In some embodiments, the plurality of ranges of final infection size is determined by: determining a probability of each final infection size in the distribution to generate a signal indicating a range of probabilities for each final infection size, the signal being processed to reduce noise therein; determining the plurality of ranges of final infection size based on the signal.

In some embodiments, the plurality of ranges of final infection size are determined based on the signal by dividing the signal into the plurality of ranges based on the identification of local minima in the signal.

In some embodiments, the protective measures include one or more of: an anti-malware facility; a malware filter; a malware detector; a block, preclusion or cessation of interaction; and a reconfiguration of one or more computer systems.

According to a second aspect of the present disclosure, there is a provided a computer system including a processor and memory storing computer program code for performing the method set out above.

According to a third aspect of the present disclosure, there is a provided a computer system including a processor and memory storing computer program code for performing the method set out above.

BRIEF DESCRIPTION OF THE DRAWINGS

Embodiments of the present disclosure will now be described, by way of example only, with reference to the accompanying drawings, in which.

DETAILED DESCRIPTION

Figure 1:
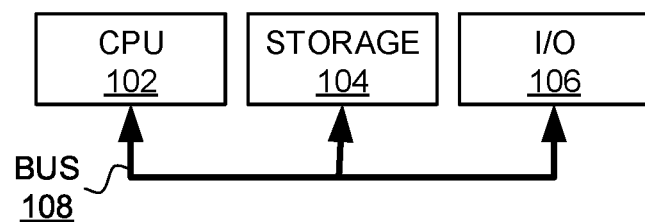
FIG. 1 is a block diagram a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random-access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Malicious software, also known as computer contaminants or malware, is software that is intended to do direct or indirect harm in relation to one or more computer systems. Such harm can manifest as the disruption or prevention of the operation of all or part of a computer system, accessing private, sensitive, secure and/or secret data, software and/or resources of computing facilities, or the performance of illicit, illegal or fraudulent acts. Malware includes, inter alia, computer viruses, worms, botnets, trojans, spyware, adware, rootkits, keyloggers, dialers, malicious browser extensions or plugins and rogue security software.

Malware proliferation can occur in a number of ways. Malware can be communicated as part of an email such as an attachment or embedding. Alternatively, malware can be disguised as, or embedded, appended or otherwise communicated with or within, genuine software. Some malware is able to propagate via storage devices such as removable, mobile or portable storage including memory cards, disk drives, memory sticks and the like, or via shared or network attached storage. Malware can also be communicated over computer network connections such as the internet via websites or other network facilities or resources. Malware can propagate by exploiting vulnerabilities in computer systems such as vulnerabilities in software or hardware components including software applications, browsers, operating systems, device drivers or networking, interface or storage hardware.

A vulnerability is a weakness in a computer system, such as a computer, operating system, network of connected computers or one or more software components such as applications. Such weaknesses can manifest as defects, errors or bugs in software code that present an exploitable security weakness. An example of such a weakness is a buffer-overrun vulnerability, in which, in one form, an interface designed to store data in an area of memory allows a caller to supply more data than will fit in the area of memory. The extra data can overwrite executable code stored in the memory and thus such a weakness can permit the storage of malicious executable code within an executable area of memory. An example of such malicious executable code is known as 'shellcode' which can be used to exploit a vulnerability by, for example, the execution, installation and/or reconfiguration of resources in a computer system. Such weaknesses, once exploited, can bootstrap a process of greater exploitation of a target system, and propagation of the malware to other computer systems.

The effects of malware on the operation and/or security of a computer system lead to a need to identify malware in a computer system in order to implement protective and/or remedial measures. While malware detection is often directed to computer systems themselves or the networks over which they communicate, interactions between computer systems can transcend the physical interconnections therebetween. In particular, interactions between computer systems that arise from communication between pairs of computer systems can be addressed. Such interactions can include, for example, interactions between users of each of a pair of computer systems using, inter alia, social media, messaging, electronic mail or file sharing facilities. Thus, a model of a set of computer systems in which interacting pairs of computer systems are identified can be employed, such interactions being based on previous communication occurring between the computer systems in the pair. Notably, such a model disregards intermediates in an interaction—such as physical resources or other computer systems involved in a communication. For example, an interaction arising from a social media communication between two users using each of a pair of computer systems will involve potentially multiple physical or logical networks, intermediate servers, service provider hosts, intermediate communication appliances and the like. Thus, a model of the physical communication becomes burdened by the intermediate features of a typical inter-computer communication. In contrast, the endpoints of an interaction such as the computer systems through which users communicate can be addressed. A similar analysis can be conducted for interactions involving email, electronic messaging, file sharing and the like.

The deployment of malware protection measures to inhibit a propagation of a malware through a set of computer systems is desirable. Most preferably, the deployment of malware protection measures is targeted to provide an effective and/or efficient inhibition of the propagation. The nature and type of malware protection measures themselves are understood by those skilled in the art and can include, inter alia: anti-malware facilities; malware filters; malware detectors; a block, preclusion or cessation of interaction and/or communication, such as between computer systems; and/or a reconfiguration of one or more computer systems or communications facilities therebetween.

Computer systems or interacting pairs of computer systems can be identified for the deployment of malware protection measures based on a simulation of a propagation of malware through the model of a set of computer systems. Such simulation can employ simulation parameters including: a rate of interaction between each interacting pair of computer systems (i.e. a number of interactions per time period); and a rate of transmission of the malware between interacting computer per interaction. Some or all of these parameters can be derived statistically according to a statistical distribution. Some or all of these parameters can be determined based on historical interaction information over a historical time period. Some or all of these parameters can be determined based on one or more machine learning processes based on historical interaction information.

Figure 2:
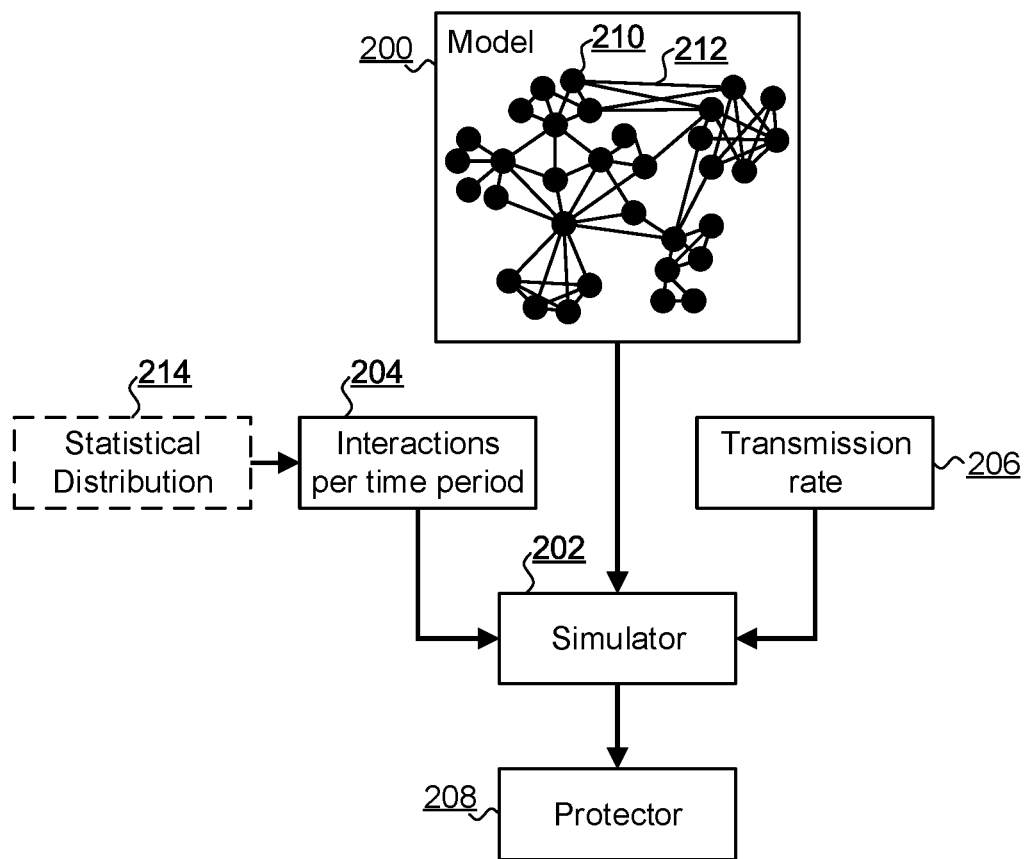
FIG. 2 is a component diagram of an arrangement for malware protection for at least a subset of a set of computer systems.

FIG. 2 is a component diagram of an arrangement for malware protection for at least a subset of a set of computer systems. A model 200 is provided as one or more data structures representing a set of computer systems and interactions therebetween. In some embodiments, the model is provided as a graph or similar data structure including nodes or vertices 210, each corresponding to a computer system, and edges 212 each connecting a pair of nodes 210 and representing interaction between computer systems corresponding to each node in the pair. Thus, an edge 212 represents interaction between a pair of computer systems. Each node 210 can have associated information for a corresponding computer system including, for example, inter alia: an identifier of the computer system; an identification of an organizational affiliation of the computer system; an identifier of a subnet to which the computer system is connected; and other information as will be apparent to those skilled in the art.

In some embodiments, an edge 212 constitutes an indication that at least one interaction has taken place over at least a predetermined historic time period between computer systems in a pair. In some embodiments, the existence of an edge 212 is not determinative, indicative or reflective of a degree, frequency or propensity of interaction between computer systems in a pair—rather, the edge 212 identifies that interaction has taken place. Edges 212 can have associated, for example, inter alia: an edge identifier; an identification of a pair of nodes (and/or the corresponding computer systems) that the edge interconnects; and/or interaction frequency information between a pair of computer systems. It will be appreciated by those skilled in the art that, while the model 200 is illustrated as a literal graph in the arrangement of FIG. 2, alternative data structures and logical representations of vertices and edges can be used, such as representations employing, for example, inter alia, vectors, arrays of vectors, matrices, compressed data structures and the like.

The arrangement of FIG. 2 includes a simulator 202 as a hardware, software, firmware or combination component arranged to perform a simulation of a propagation of a malware in the set of computer systems represented by the model 200. The simulator 202 is operable on the basis of simulation parameters including: an interaction rate 204 as a number of interactions between pairs of interacting computer systems in a time period; and a transmission rate 206 as a rate of transmission of a malware between computer systems in a pair of systems per interaction. In some embodiments, the transmission rate 206 is a probability of transmission of a malware from one node to another node during an interaction between the nodes. In some embodiments, the transmission rate 206 incorporates aspects of a malware infection process. For example, in the case of malware transmitted as a web-link between two computer systems by email, the transmission rate can reflect all of: a probability that an email is communicated between the two computer systems; a probability that the email includes the malicious web-link; and a probability that a recipient accesses the malicious web-link resulting in malware infection.

The interactions rate 204 can be sampled from one or more statistical distributions 214 to model different types of interaction. For example, a Poisson or uniform distribution can be used to model a number of interactions between a pair of computer systems over a time period, such as a number of emails communicated over the time period. The transmission rate 206 can be initialized in advance, such as by a predetermined value. For example, a transmission rate 206 having a value of 0.0001 is indicative of a probability that a first computer system in an interacting pair of computer systems transmits a malware to a second computer system in the pair within a single predetermined time period is 0.0001. The interaction rate 204 between each of an interacting pair of computer systems in the set of computer systems can be defined based on historical records of interactions between the computer systems.

The simulator 202 can operate on the basis of configurable characteristics such as simulation assumptions. For example, the simulator 202 may operate on the basis that any computer system as represented by a node in the model 200 can only transmit the malware to first-degree neighbors according to the model 200. Further, the simulator 202 preferably operates on the basis that each computer system has a state of infection at a point in time. States of infection at a point in time can include, for example: a state of susceptibility in which a computer system is susceptible to infection, such as a computer system that is not and has not been so far infected and is not specifically protected from infection by a particular malware; a state of infected in which a computer system is subject to infection by the malware at the point in time; and a state of removed or remediated in which a computer system is remediated of a past infection or protected from prospective infection by the malware. It will be appreciated by those skilled in the art that sub-states of these states can also be employed, such as, inter alia: an infected state that is not infectious (i.e. transmission of malware cannot be effected by a computer system in such a state); an infected state that is infectious; an infected state that is detected; and an infected state that is not detected (such as might be determined by the simulator 202).

Thus, in use, the simulator 202 is operable for a time period to model the propagation of a malware infection. One or more predetermined source computer systems represented in the model 200 can be selected as originating computer systems for the malware infection such that propagation is simulated from such originating computer systems. In some embodiments, the simulator 202 is executed for each of a plurality of time periods so as to model the propagation of the malware in the set of computer systems over time. Additionally or alternatively, the simulator 202 can be performed a plurality of times for each of a plurality of predetermined source computer systems selected as originating computer systems for the malware infection.

For example, if the transmission rate 206 is denoted as p, and the interaction rate 204 is denoted as c, the simulator 202 can model propagation of a malware by formulating an infection probability of a susceptible computer system indicated as node i by its infected neighbors:

Considering $node_i$ where $i \in \{1, \ldots, n\}$ where $n$=number of nodes in the model, $node_i$'s infectious neighbours $Nhb_{i,j}=$
$\{nhb_{i,1}, \ldots, nhb_{i,m^{(i)}}\}$ where $j \in \{1, \ldots, m^{(i)}\}$ and $m^i \in \mathbb{N}$ is the number of neighbours of $node_i$ The corresponding set of interactions are $Inter_{i,j} = \{c_{i,1}, \ldots, c_{i,m^{(i)}}\}$.

$P(Nhb_i \text{ infects } node_i) =$ $P(nhb_{i,1} \text{ infects } node_i \text{ during any of their } c_{i,1} \text{ interactions} =$ $1 - \prod_j P(nhb_{i,j} \text{ does not infect } node_i \text{ during an interaction})^{c_{i,j}} =$ $$1 - \prod_j (1-p)^{c_{i,j}} = 1 - (1-p)^{\sum_{j=1}^{m^{(i)}} c_{i,j}}$$

Thus, an exemplary model for the simulator 202 to model transitions of nodes 210 from a state of susceptible to infected and from infected to removed (i.e. remediated) can be:

| | |
|---|---|
| Probability of a node transitioning from a susceptible state to an infected state | $1-(1-p)^{\sum_{j=1}^{m^{(i)}} c_{i,j}}$ |
| Probability of a node in a susceptible state remaining in the susceptible state | $(1-p)^{\sum_{j=1}^{m^{(i)}} c_{i,j}}$ |
| Probability of a node transitioning from an infected state to a removed state | $\theta_r$ |
| Probability of a node in an infected state remaining in the infected state | $1-\theta_r$ |
| Probability of a node in the removed state remaining in the removed state | 1 | where $\theta$ is a rate of removal/remediation.

Responsive to the simulation by the simulator 202, and, in particular, responsive to the model of propagation of a malware determined by the simulator 202, a protector component 208 is operable to deploy malware protection measures intended to inhibit a propagation of the malware through the set of computer systems. The protector component 208 is a hardware, software, firmware or combination component arranged to access output from the simulator 202 such as one or more models, data structure representations, images, animations, visually renderable indications or other suitable representations of states of nodes corresponding to simulated states of computer systems in the set of computer systems. For example, a representation of states of computer systems can be provided based on the model 200 so as to indicate, for each computer system by way of a node in the model 200, a state of the computer system (such as susceptible, infected, removed) over each of a plurality of time periods for which the simulator 202 was executed.

The protector 208 identifies one or more computer systems or interacting pairs of computer systems (such as are represented by edges 212 in the model 200) for the deployment of malware protection measures. Such identified systems or pairs of systems can be selected based on, for example, inter alia: a computer system or interacting pair of systems through which malware propagates in the simulation to a subset of other computer systems in the set of computer systems; identifying a subset of computer systems having a relatively greater, or greatest, proportion of computer systems infected by the malware according to the simulation, so as to identify one or more computer systems or pairs of systems as a gateway, link or bridge to such identified subset; a number of computer systems to which the malware is propagated via a computer system or pair of systems; and other criteria as will be apparent to those skilled in the art. For example, "choke-points" in the model 200 can be identified by the protector 208 based on the simulator 202 output as nodes or pairs of nodes representing computer systems or interacting pairs of systems constituting pathways for propagation of the malware to subsets of nodes in the model 200. The malware protection measures deployed by the protector 208 can include those previously described, and in this way at least a subset of the set of computer systems can be protected from the malware by the targeted deployment of malware protection measures.

The model 200 can further identify a class of interaction between interacting pairs of computer systems, such as an identification of a type of interaction that takes place between computer systems. For example, computer systems that typically interact by way of email can be classified differently to computer systems that typically interact by way of file-sharing, network drive sharing or the like. A class of interaction between computer systems can be determined based on historical records of interactions between each computer system in an interacting pair. Thus, the rate of transmission 206 of the malware per interaction can be determined for each interacting pair of computer systems based on the class of interaction for the interacting pair so as to take account of the different types of interaction and a different propensity for malware propagation by each type.

Figure 3:
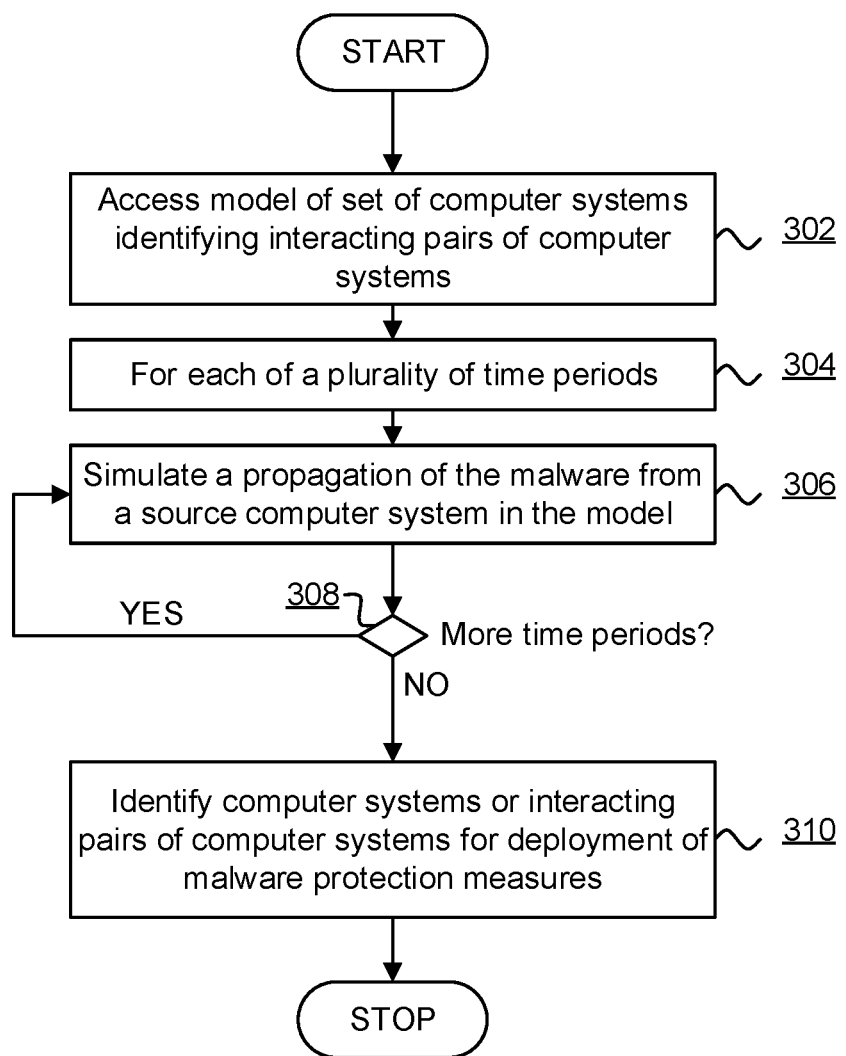
FIG. 3 is a flowchart of a malware protection method.

FIG. 3 is a flowchart of a malware protection method. Initially, at 302, the method accesses a model of a set of computer systems identifying interacting pairs of the computer systems based on interactions corresponding to previous communication occurring between the computer systems in the pair. At 304 the method commences an iteration between each of a plurality of time periods for simulation. At 306, for each simulated time period, the method simulates a propagation of a malware originating from a predetermined source computer system in the model. The simulation is based on a number of interactions per time period 204 between each interacting pair of computer systems in the set, and a rate of transmission 206 of the malware per interaction. The method loops at 308 through the time periods. Subsequently, at 310 the method identifies one or more computer systems or interacting pairs of computer systems for the deployment of a malware protection measure to inhibit a propagation of the malware through the set of computer systems.

Figure 4:
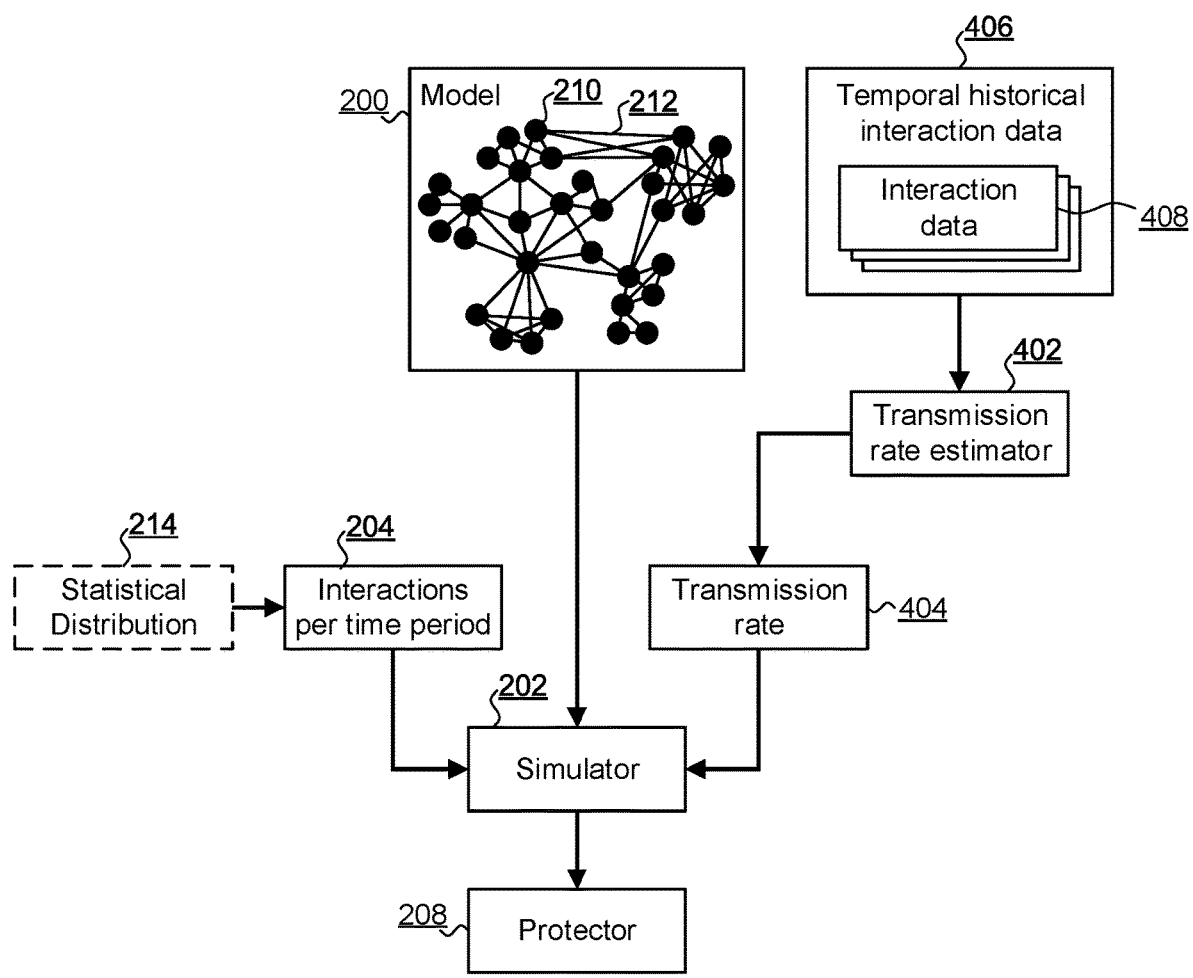
FIG. 4 is a component diagram of an arrangement for malware protection for at least a subset of a set of computer systems.

FIG. 4 is a component diagram of an arrangement for malware protection for at least a subset of a set of computer systems. Many of the elements of FIG. 4 are identical to those described above with respect to FIG. 2 and these will not be repeated here. The arrangement of FIG. 4 is operable during an infection, by a malware, of one or more computer systems in the set of computer systems and, accordingly, nodes 210 in the model 200 include indications of an infection state as, at least, susceptible or infected. Thus, the arrangement of FIG. 4 is operable during an infection such as in real-time while an infection is occurring in the set of computer systems.

According to the arrangement of FIG. 4, the transmission rate 404 is determined based on a set of temporal historical interaction data 406. The temporal historical interaction data 406 identifies interactions 408 between pairs of computer systems represented in the model 200 during each of a plurality of historical time periods—the time period being historical in that they occur prior to the operation of the simulator 202. A transmission rate estimator 402 is provided as a hardware, software, firmware or combination component for estimating a transmission rate 404 for input to the simulator 202 based on the temporal historical interaction data 406. The transmission rate estimator 402 can be operable to determine the rate of transmission 404 by modeling probabilities of transmission of the malware between interacting pairs of computer systems identified in the temporal historical interaction data.

In some embodiments, the transmission rate estimator 402 determines a maximum likelihood function for interactions occurring in each of a plurality of time periods for the historical interaction data 406 to determine an average probability of transmission of the malware between interacting pairs of computer systems. Additionally or alternatively, the probabilities of transmission can be modelled using a suitable statistical modeling function such as a Markov Chain Monte Carlo method for approximation of a probability as will be understood by those skilled in the art.

Accordingly, arrangements according to FIG. 4 employ interaction data 408 indicating actual frequencies of interactions between computer systems represented in the model 200. Such interaction data can be directed such that, for a computer system (node in the model 200), only incoming edges (along which interactions are received) are considered prospective transmitters of malware. The interaction data 408 is temporal in that it is broken down into time periods in order that historic malware infection propagation can be modelled on a suitable time-based granularity (such as by minute, hour, day). A number of interactions with a susceptible target (i.e. endpoint of an interaction) computer system from only infected source (i.e. originating) computer system can be identified in the interaction data 408. By way of rationalizing interaction data 408, interactions between interacting pairs of computer systems can be represented as a summary or summation of total incoming interactions from infected neighbors per time period for input to the transmission rate estimator 402.

Figure 5:
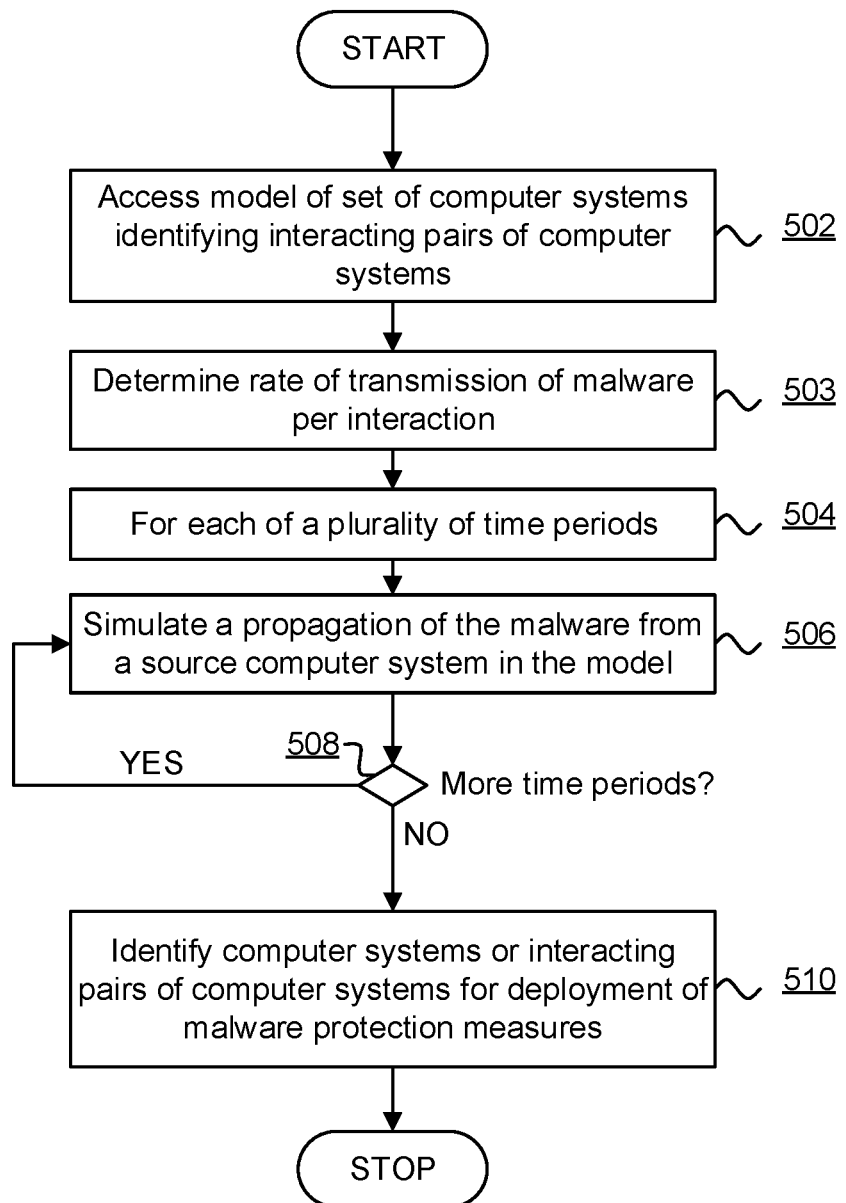
FIG. 5 is a flowchart of a malware protection method.

The transmission rate estimator 402 can determines a maximum likelihood function to estimate the transmission rate 404 according to a method such as:

Input: time: T
   list of vector of interactions: c
   number of nodes: n
   list of binary vectors length n,
     containing 1 for infected,
     containing 0 for susceptible nodes: y
Output: average infection transmission rate per interaction: p
For each time period in T:
   create vector of results
   For each susceptible node:
     sum all interactions c from infected nodes
     input summed interactions, binary vector y to
       maximum likelihood function
     apply log transformation to the maximum likelihood function
     minimize the log transformed function
     append result of minimization to vector of results
   return mean of vector of results FIG. 5 is a flowchart of a malware protection method. Many of the operations of FIG. 5 are identical to those described above with respect to FIG. 3 and these will not be repeated here. Additionally, FIG. 5 includes operation 503, according to which a rate of transmission of malware per interaction is estimated by the transmission rate estimator as described above.

Embodiments of the present disclosure employ an approach to deploying malware protective measures based on a metric of final infection size in a population of network-connected computer systems. A final infection size is a total number of systems in a population of systems that are infected by propagation of a malware in the population. In particular, embodiments of the present disclosure employ final infection size information that is predicted for a population of computer systems using a malware propagation model and simulation process such as those described in detail above with respect to FIGS. 2 to 5. A malware propagation model can include a model (such as model 200) of a population of systems, and parameters such as the interaction rate 204, transmission rate 206 and a recovery, remediation or removal rate. Simulations according to the aforementioned exemplary processes or alternative suitable simulation processes are employed to generate a distribution of predicted final infection size. In some embodiments, simulations are performed for a malware infection originating at each system in the population.

Classes of final infection size are defined based on ranges within the distribution so as to determine a weighted associate of each range of final infection sizes with systems in the population. The ranges are preferably determined based on a determination of a probability of each final infection size. The probabilities so determined can be modelled such as by correlating a probability with each final infection size so as to generate a signal of probabilities. Such a signal can constitute a promising basis for dividing the distribution into ranges by, for example, local minima detection in the signal of probabilities where a local minima can constitute a point of separation between two ranges of final infection sizes.

The population of systems is divided into clusters of systems based on characteristics of the systems such as physical or logical position, network configuration, system type or the like. An association can thus be made between ranges of final infection sizes and each cluster of systems, the association being weighted according to a number of incidences, during simulation, that a malware infection beginning at systems in a cluster of systems resulted in a final infection size within a particular range of sizes. This association is used to determine clusters of systems for which additional malware controls or monitoring are occasioned. For example, the determination can be based on: a magnitude of a final infection size or a range of final infection sizes; a probability of a final infection size or range, median or mean of a range of final infection sizes; and a weight of an association between a cluster of systems and a range of final infection sizes. In this way, in dependence on, for example, a detection of an outbreak of a malware originating at a particular computer system or within a particular cluster of computer systems, appropriate and proportionate control responses can be deployed in view of the likelihood of a range of final infection sizes.

Figure 6:
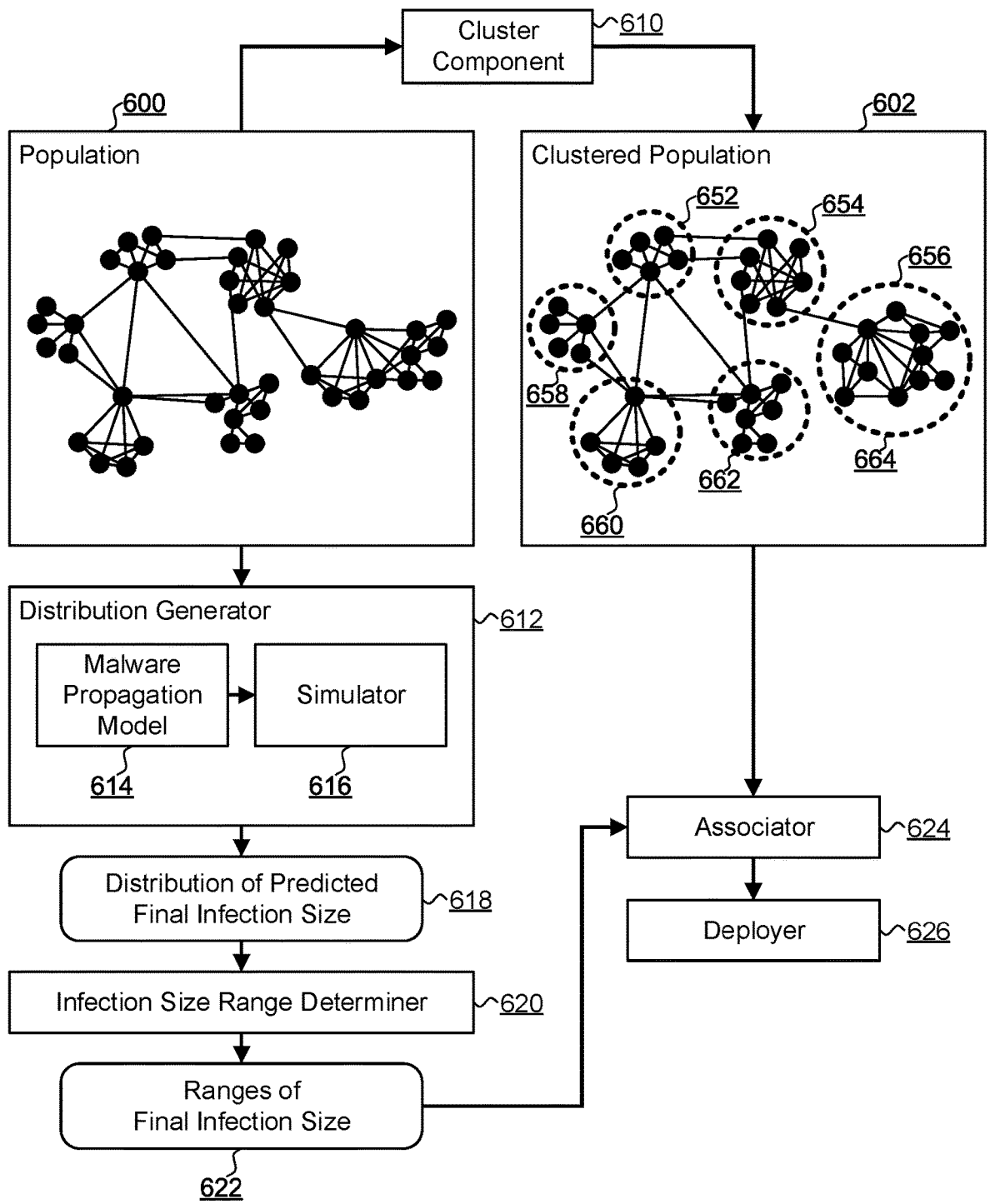
FIG. 6 is a component diagram of an arrangement of an arrangement for malware protection for at least a subset of a set of computers in accordance with embodiments of the present disclosure.

FIG. 6 is a component diagram of an arrangement of an arrangement for malware protection for at least a subset of a set of computers in accordance with embodiments of the present disclosure. A population 200 of network-connected computer systems is provided in which communications takes place between certain pairs of the computer systems, such communication constituting a potential conduit for the transmission of malware between the computer systems. A cluster component 610 is a hardware, software, firmware or combination component arranged to cluster the population of computer systems 600 into a clustered population 602 comprising a plurality of clusters 652, 654, 656, 658, 660, 662, 664. Systems are clustered according to at least one common characteristic such as, inter alia: a logical or physical position of computer systems in the population; a network attribute of computer systems in the population; a predetermined role or function of computer systems in the population; and a common type of device of computer systems in the population. Such clustering can be undertaken by the cluster component 610 based on predetermined clustering rules based on the one or more characteristics, and/or using clustering algorithms based on such characteristics as are well known in the art.

A distribution generator 612 is provided as a hardware, software, firmware or combination component for determining a distribution 618 of predicted final infection size for the population 600. The final infection size is a total number of systems infected in the population 600 by a propagation of a malware in the population 600. Notably, a malware will propagate through systems in stages of vulnerable, infected and remediated/removed. The distribution 618 generated by the generator 612 includes one or more estimated final infection sizes for malware infections originating at each of a plurality of systems in the population 600 such that a distribution of all predicted final infection sizes across all such originating systems is generated. In some embodiments, final infection sizes are predicted for originating systems at least including systems in each cluster in the clustered population 602. In one example embodiment, final infection sizes are predicted for malware originating at every system, and further most preferably multiple final infection sizes are predicted for each originating system.

The distribution generator 612 predicts the final infection size for an originating computer system by a simulation of malware propagation through the population 600 from the originating system using a simulator 616 such as has been previously described. The simulator 616 operates on the basis of at least one malware propagation model 614 including a definition of at least: a transmission rate of malware between systems in the population determined to be in communication with each other; and a removal rate of systems being removed from a state of infection by the malware.

In some embodiments the malware propagation model identifies interacting pairs of the computer systems in the population 600 based on interactions corresponding to previous communication occurring between the computer systems in the pair, such as has been described previously. Further, and in some embodiments, the simulator 616 simulates a propagation of the malware from an originating system in the population 600 over a plurality of simulated time periods where the simulation is based on a number of interactions per time period between each interacting pair of computer systems in the population, the transmission rate and the removal rate.

The distribution of predicted final infection size 618 is subsequently processed by an infection size range determiner 620 as a hardware, software, firmware or combination component arranged to determine multiple ranges 622 or classes of final infection size from the distribution 618. Each range of infection size can be a continuous range of final infection sizes and, in some embodiments, is determined according to the following procedure.

Initially, a probability of each final infection size in the distribution is determined. This can be determined by comparing a frequency of occurrence of each final infection size in the distribution with the total number of final infection sizes in the distribution. The probabilities of all final infection sizes can be used to form a signal indicating a range of probabilities for each final infection size. In one example embodiment, the signal is processed to smooth and/or reduce noise therein, such as by the application of one or more suitable signal processing methods including Gaussian Kernel filter or Savitzky-Golay filter. The signal provides a useful basis for dividing the final infection sizes into classes or ranges 622. For example, the ranges 622 of final infection size can be determined based on the signal by dividing the signal into the plurality of ranges 622 based on the identification of local minima in the signal (such minima indicating points of locally relatively lower probability of final infection size). In one embodiment, the number of ranges is constrained to a predetermined limit and, where a number of identified ranges exceeds this limit, adjacent ranges can be combined.

An associator 624 component is a hardware, software, firmware or combination component arranged to determine a weighted association between each cluster in the clustered population 602 and each range in the set of ranges of final infection size 622. The associations by the associator 624 can be determined automatically based on the distribution 618 associating each originating system in the population 600 with a frequency of one or more final infection sizes arising from the malware propagation simulations, and the cluster membership information in the clustered population 602. The weight of each association between a cluster and a range of final infection sizes can be determined, for example, based on a frequency of occurrence of each final infection size within the range arising from simulations for originating systems in the cluster. Thus, for example, a proportion of a cluster of systems contributing to final infection sizes within a range of sizes can be used to weight the association between the cluster and the range.

A deployer 626 component is provided as a hardware, software, firmware or combination component for deploying protective measures for one or more of the clusters of systems in the clustered population 602 in dependence on the weighted associations between clusters and ranges of final infection size. For example, the deployer 626 determines clusters of systems for additional malware controls or monitoring based on: a magnitude of a final infection size or a range of final infection sizes; a probability of a final infection size or range, median or mean of a range of final infection sizes; and a weight of an association between a cluster of systems and a range of final infection sizes. In this way, in dependence on, for example, a detection of an outbreak of a malware originating at a particular computer system or within a particular cluster of computer systems, appropriate and proportionate control responses can be deployed in view of the likelihood of a range of final infection sizes. Examples of protective measures that may be deployed by the deployer 626 include: an anti-malware facility; a malware filter; a malware detector; a block, preclusion or cessation of interaction; and a reconfiguration of one or more computer systems.

Figure 7:
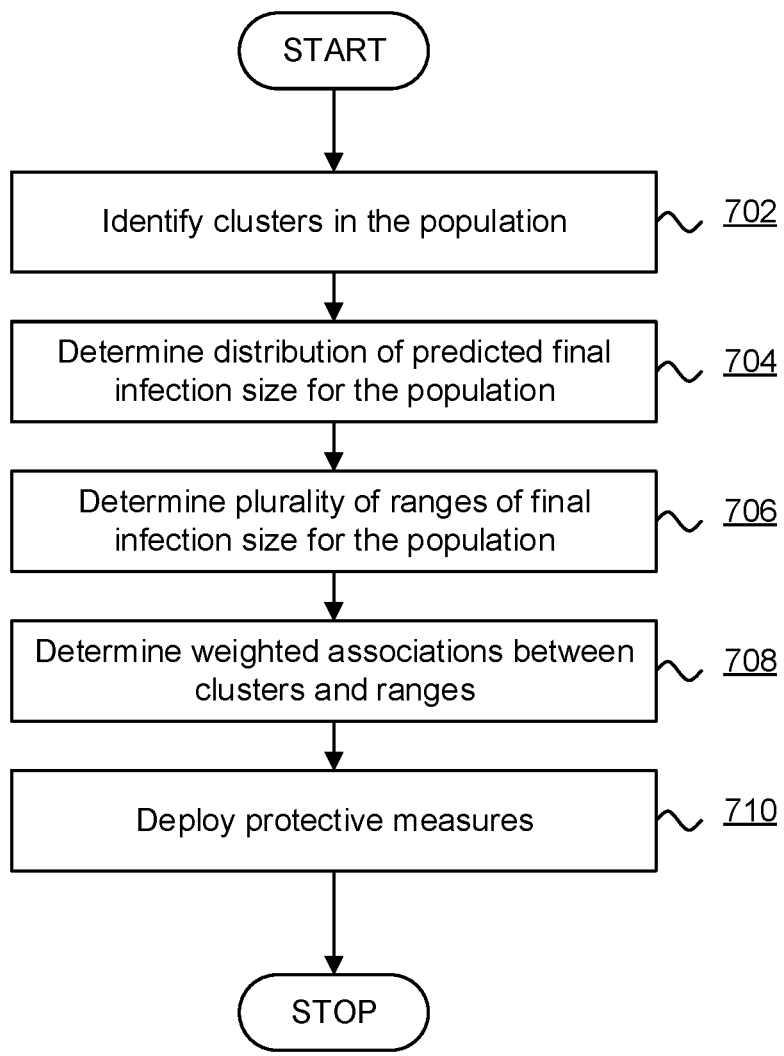
FIG. 7 is a flowchart of a malware protection method in accordance with embodiments of the present disclosure.

FIG. 7 is a flowchart of a malware protection method in accordance with embodiments of the present disclosure. Initially, at 702, the method identifies clusters of computer systems in the population 600 based on the systems sharing at least one common characteristic. At 704 the method determines a distribution 618 of predicted final infection size for the population 600 including predictions for infections originating with systems in the population 600. Each predicted final infection size is determined by a forecasting simulation of malware propagation from an originating system in the population. At 706 the method determines multiple ranges of final infection size from the distribution. At 708 the method determines weighted associations between clusters of computer systems and ranges of final infection size based on measures of numbers of originating computer systems in each cluster associated with each range of final infection. Subsequently, at 710, the method deploys protective measures for one or more clusters of computer systems responsive to the weighted associations.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the disclosure is not limited thereto and that there are many possible variations and modifications which fall within the scope of the disclosure.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented malware protection method to protect computer systems in a population of network-connected computer systems, the method comprising:
    identifying a plurality of clusters of the computer systems in the population of network-connected computer systems, wherein the computer systems within each of the plurality of clusters share at least one common characteristic;
    determining a distribution of a metric of predicted final infection size for the population as a total number of computer systems infected by a propagation of a malware in the population, the distribution including predictions for infections originating with computer systems in the population, each predicted final infection size being determined by a forecasting simulation of malware propagation from an originating computer system in the population, the forecasting simulation of malware propagation being performed based on at least one malware propagation model defining at least a transmission rate of the malware between computer systems in the population determined to be in communication with each other, and a removal rate of computer systems being removed from a state of infection by the malware;
    determining a plurality of ranges of final infection size from the distribution;
    determining weighted associations between the identified plurality of clusters of computer systems and the determined ranges of final infection size based on numbers of incidences, during the forecasting simulation, that a malware infection beginning at originating computer systems in each cluster results in a final infection size within each range of final infection size, wherein determining the weighted associations comprises determining associations based on an association between each originating computer system in the population and a frequency of one or more final infection sizes arising from the forecasting simulation of malware propagation, and a cluster membership of the computer system, and determining the weighted associations for each determined association based on a frequency of occurrence of each final infection size within the determined ranges; and
    deploying protective measures for one or more of the plurality of identified clusters of computer systems responsive to the weighted associations.

2. The method of claim 1, wherein the at least one common characteristic includes: a logical position or a physical position of the computer systems in the population; a network attribute of the computer systems in the population; a predetermined role or a function of the computer systems in the population; or a common type of device of the computer systems in the population.

3. The method of claim 1, wherein the at least one malware propagation model identifies interacting pairs of the computer systems in the population based on interactions corresponding to previous communication occurring between the computer systems in the pair.

4. The method of claim 3, wherein the forecasting simulation includes simulating, over a plurality of simulated time periods, a propagation of the malware from an originating computer system in the population, the simulating being based on a number of interactions per time period between each interacting pair of computer systems in the population, the transmission rate and the removal rate.

5. The method of claim 1, wherein the distribution includes predictions for infections originating with each computer system in the population.

6. The method of claim 1, wherein the plurality of ranges of final infection size is determined by:
    determining a probability of each final infection size in the distribution to generate a signal indicating a range of probabilities for each final infection size, the signal being processed to reduce noise therein; and
    determining the plurality of ranges of final infection size based on the signal.

7. The method of claim 6, wherein the plurality of ranges of final infection size are determined based on the signal by dividing the signal into the plurality of ranges based on an identification of local minima in the signal.

8. The method of claim 1, wherein the protective measures include one or more of: an anti-malware facility; a malware filter; a malware detector; a block, a preclusion or a cessation of interaction; or a reconfiguration of one or more computer systems.

9. A computer system comprising:
    a processor and memory storing computer program code for malware protection of computer systems in a population of network-connected computer systems, by:
        identifying a plurality of clusters of the computer systems in the population of network-connected computer systems, wherein the computer systems within each of the plurality of clusters share at least one common characteristic;
        determining a distribution of a metric of predicted final infection size for the population as a total number of computer systems infected by a propagation of a malware in the population, the distribution including predictions for infections originating with computer systems in the population, each predicted final infection size being determined by a forecasting simulation of malware propagation from an originating computer system in the population, the forecasting simulation of malware propagation being performed based on at least one malware propagation model defining at least a transmission rate of the malware between computer systems in the population determined to be in communication with each other, and a removal rate of computer systems being removed from a state of infection by the malware;
        determining a plurality of ranges of final infection size from the distribution;
        determining weighted associations between the identified plurality of clusters of computer systems and the determined ranges of final infection size based on numbers of incidences, during the forecasting simulation, that a malware infection beginning at originating computer systems in each cluster results in a final infection size within each range of final infection size, wherein determining the weighted associations comprises determining associations based on an association between each originating computer system in the population and a frequency of one or more final infection sizes arising from the forecasting simulation of malware propagation, and a cluster membership of the computer system, and determining the weighted associations for each determined association based on a frequency of occurrence of each final infection size within the determined ranges; and deploying protective measures for one or more of the plurality of identified clusters of computer systems responsive to the weighted associations.

10. A non-transitory computer-readable storage medium storing computer program code to, when loaded into a computer system and executed thereon, cause the computer system to implement malware protection to protect computer systems in a population of network-connected computer systems, by:

identifying a plurality of clusters of the computer systems in the population of network-connected computer systems, wherein the computer systems within each of the plurality of clusters share at least one common characteristic;

determining a distribution of a metric of predicted final infection size for the population as a total number of computer systems infected by a propagation of a malware in the population, the distribution including predictions for infections originating with computer systems in the population, each predicted final infection size being determined by a forecasting simulation of malware propagation from an originating computer system in the population, the forecasting simulation of malware propagation being performed based on at least one malware propagation model defining at least a transmission rate of the malware between computer systems in the population determined to be in communication with each other, and a removal rate of computer systems being removed from a state of infection by the malware;

determining a plurality of ranges of final infection size from the distribution;

determining weighted associations between the identified plurality of clusters of computer systems and the determined ranges of final infection size based on numbers of incidences, during the forecasting simulation, that a malware infection beginning at originating computer systems in each cluster results in a final infection size within each range of final infection size, wherein determining the weighted associations comprises determining associations based on an association between each originating computer system in the population and a frequency of one or more final infection sizes arising from the forecasting simulation of malware propagation, and a cluster membership of the computer system, and determining the weighted associations for each determined association based on a frequency of occurrence of each final infection size within the determined ranges; and deploying protective measures for one or more of the plurality of identified clusters of computer systems responsive to the weighted associations.

* * * * *